United States Patent [19]
Kovacs et al.

[11] Patent Number: 5,768,320
[45] Date of Patent: Jun. 16, 1998

[54] READ SYSTEM FOR IMPLEMENTING PR4 AND HIGHER ORDER PRML SIGNALS

[75] Inventors: Janos Kovacs, North Andover; Ronald Kroesen, Harvard, both of Mass.; Philip Quinlan, Castletroy, Ireland

[73] Assignee: Analog Devices, Inc., Norwood, Mass.

[21] Appl. No.: 523,648

[22] Filed: Sep. 5, 1995

[51] Int. Cl.$^6$ .............................. G11B 5/09; G11B 20/10
[52] U.S. Cl. ...................... 375/341; 375/290; 364/140; 360/46
[58] Field of Search ........................ 375/262–264, 375/290, 286, 341; 360/46; 364/140, 724.19

[56] References Cited

U.S. PATENT DOCUMENTS

| | | | |
|---|---|---|---|
| 4,890,299 | 12/1989 | Dolivo et al. | |
| 5,258,933 | 11/1993 | Johnson et al. | 364/602 |
| 5,311,178 | 5/1994 | Pan et al. | |
| 5,341,249 | 8/1994 | Abbott et al. | |
| 5,345,342 | 9/1994 | Abbot et al. | 360/48 |
| 5,381,359 | 1/1995 | Abbott et al. | 364/724.19 |
| 5,384,671 | 1/1995 | Fisher | 360/51 |
| 5,422,601 | 6/1995 | Kovacs et al. | |
| 5,422,760 | 6/1995 | Abott et al. | 360/46 |
| 5,493,454 | 2/1996 | Ziperovich et al. | 360/45 |
| 5,550,683 | 8/1996 | Koren | 360/46 |
| 5,552,942 | 9/1996 | Ziperovich et al. | 360/51 |
| 5,576,906 | 11/1996 | Fisher et al. | 360/77.08 |
| 5,583,705 | 12/1996 | Ziperovich et al. | 360/45 |
| 5,600,502 | 2/1997 | Fisher | 360/51 |

OTHER PUBLICATIONS

Cideciyan et al., "A PRML System for Digital Magnetic Recording" *IEEE Journal on Selected Areas in Communication*, vol. 10, No. 1, Jan. 1992, pg.

Knudson et al., "Dynamic Threshold Implementation of the Maximum–Likelihood Detector for the EPR4 Channel", *Globecom '91*, pp. 2135–2139.

M.J. Ferguson, "Optimal Reception for Binary Partial Response Channels" *The Bell system Technical Journal*, vol. 51, No. 2, Feb., 1972, pp. 493–505.

Richetta, et al., "A 16MB/s PRML Read/Write Data Channel", *1995 IEEE International Solid State Circuits Conference, Digest of Technical Papers*, pp. 78–79.

Siegel et al., "Modulation and Coding for Information Storage", *IEEE Communication Magazine*, Dec. 1991, pp. 68–86.

*Primary Examiner*—Wellington Chin
*Assistant Examiner*—Jean B. Corrielus
*Attorney, Agent, or Firm*—Iandiorio & Teska

[57] ABSTRACT

A read system for implementing PR4 and higher order PRML signals includes: a continuous time programmable filter, for receiving a read signal representative of a binary signal from a storage medium and for shaping the read signal into a PR4 shaped read signal; an analog finite impulse response (AFIR) filter, responsive to the continuous time programmable filter, for sampling and forming the PR4 shaped read signal into a PR4 shaped multilevel read signal; an analog to digital converter, responsive to the AFIR filter, for converting the PR4 shaped multilevel read signal from analog to digital; a data sequence filter, responsive to the analog to digital converter, for transforming the PR4 shaped multilevel digital read signal to a predetermined order PRML signal; and a Viterbi detector, responsive to the data sequence filter, for detecting the binary signal from the predetermined order PRML signal.

19 Claims, 7 Drawing Sheets

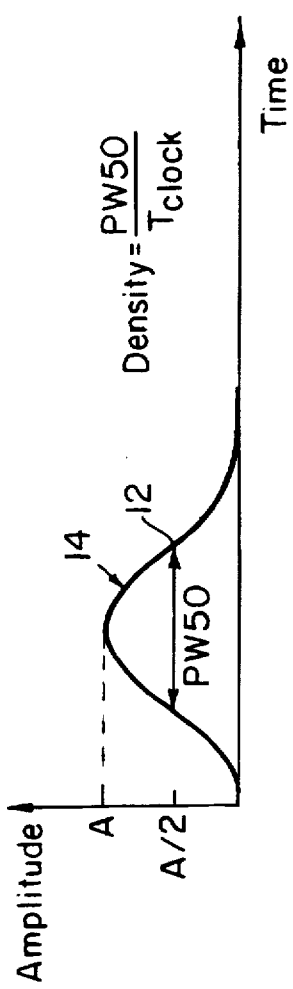
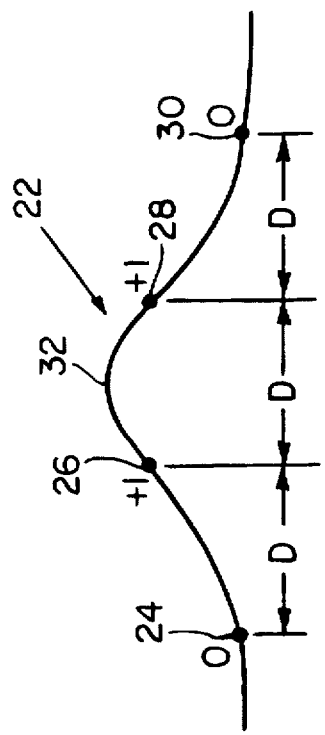
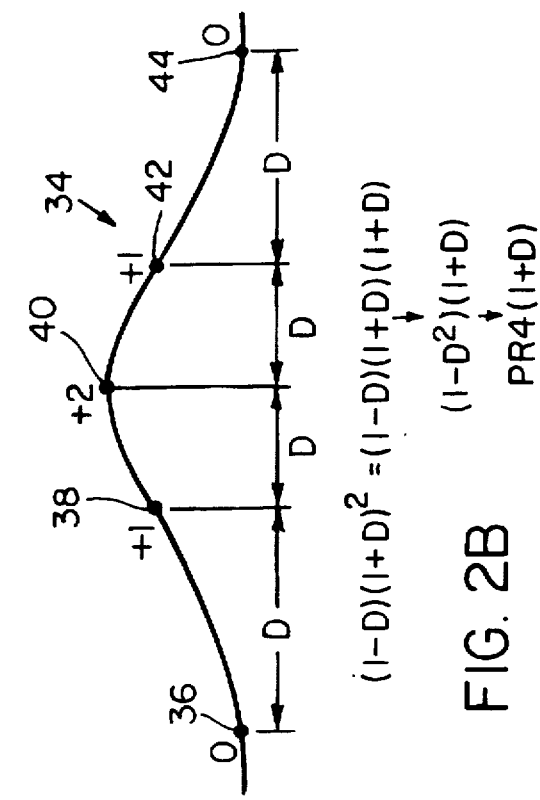
FIG. 1A
FIG. 2A
FIG. 2B

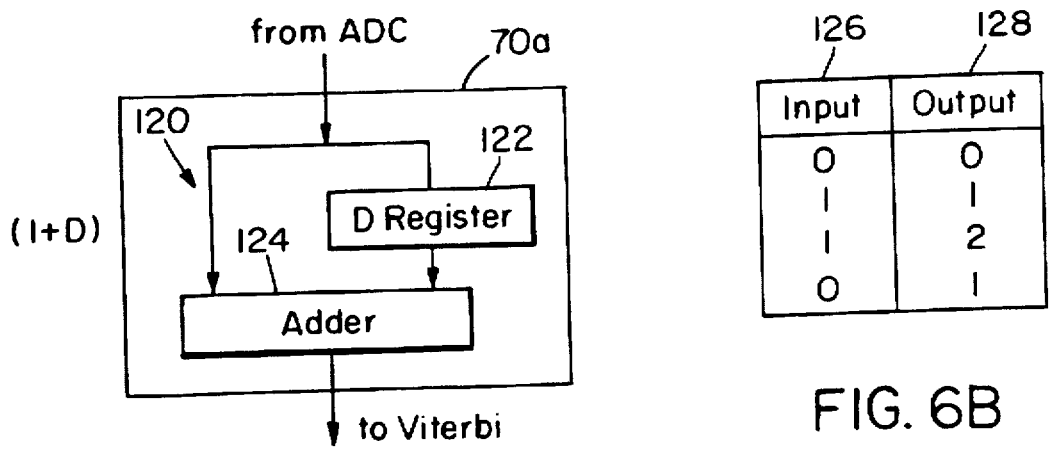
FIG. 6A
FIG. 6B
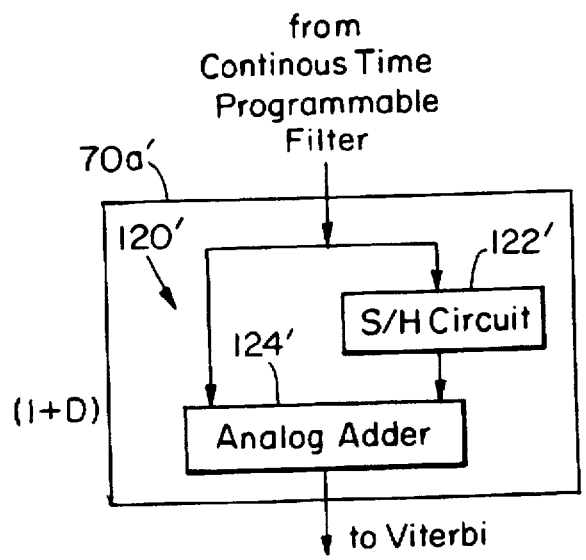
FIG. 6C

READ SYSTEM FOR IMPLEMENTING PR4 AND HIGHER ORDER PRML SIGNALS

FIELD OF INVENTION

This invention relates to a system for signal processing in a channel, such as a magnetic recording channel and more particularly to such a system which is capable of transforming a signal from a storage medium into any order PRML signal.

BACKGROUND OF INVENTION

In magnetic recording devices, such as magnetic disks and tapes, a recording head is used to read and write information to and from a magnetic surface. In a typical rotating medium-based storage system, data is stored on magnetic disks in a series of tracks. The read/write head detects variations in the magnetic orientation of the disk surface. A pattern of external and internal fields are created as the head and recording surface are moved relative to each other. The patterns are similar to a series of bar magnets of changing polarities. The polarity transitions are then readable as transitions in the magnetic flux at the recording surface. In the read mode the magnetic field of the storage surface is detected and a voltage is induced in a coil proportional to the rate of change of the flux. The read channel then processes this analog voltage signal to obtain the digital data.

Magnetic storage devices sometimes use analog peak detection to process incoming read signals. However, as recording density increases, analog peak detection becomes unreliable because of a large amount of inter-symbol interference (ISI) between adjacent pulses of the read signal. In other words, as the adjacent pulses are more closely spaced they tend to interfere with each other causing the formation of composite signals of adjacent pulses which the peak detector cannot distinguish. Thus, the peak detector is unable to accurately detect the data when there is large ISI present.

In order to overcome the problems associated with peak detectors, partial response maximum likelihood (PRML) channels were developed, which utilize, inter alia, a Viterbi detector to resolve the densely packed individual pulses from the composite signals formed as a result of ISI. Partial response systems allow ISI to occur in a controlled manner such that some desirable partial response signal is obtained. The partial response polynomial describes the ISI due to neighboring pulses and the Viterbi detector is used to recover the data in the presence of noise. Early PRML channels developed to resolve the individual pulses transformed the incoming read signal pulses into PRML signals known as PR4 (Partial Response Class 4) signals or targets as described in Cideciyan et al., "A PRML System for Digital Magnetic Recording", *IEEE Journal in Selected Areas in Communications*, Vol. 10, No. 1, January 1992, Pgs. 38–56, which is incorporated herein by reference in its entirety. These PR4 signals are then provided to the Viterbi detector to decode the composite signals to resolve individual interfering pulses. Such a detection scheme works well for data densities where only adjacent samples interfere; however, as the densities further increase and three or more consecutive samples interfere, higher order PRML or extended PR4 (e.g. $E^2PR4 \ldots E^nPR4$) signals or targets are utilized with detection systems having more advanced Viterbi detectors to decode the multiple interfering pulses.

PRML signals can be expressed mathematically as polynomials of the form: $(1-D^2)(1+D)^n$. The value of n determines the order PRML signal being represented. In other words for n=0 (zero order) the polynomial represents a PR4 signal. For n=1 (first order) the polynomial represents an EPR4 signal and so on.

Although higher order PR4 signal detection (EPR4 ... $E^nPR4$) is more accurate (i.e. lower error rates or fewer errors per given number of bits) at higher bit densities, PR4 detection tends to be more accurate at lower bit densities. This is depicted in and described with regard to FIG. 1 and 1B below. Incoming read signals from tracks located in different portions of a disk being read have pulses with different shapes which more closely match different order PRML signals or targets. For example, incoming read signals from the inner tracks on the disk are typically more spread out (higher density) and more closely resemble higher order PRML signals, while incoming signals from outer tracks on a disk are more compressed (lower density) and more closely match PR4 signals. The more the incoming read signals need to be transformed to conform to a particular type of signal (e.g., PR4, EPR4, etc.), the more the read signals need to be filtered to increase the higher frequencies and hence the more noise that is introduced into the system. This lowers the signal to noise ratio and the overall detection accuracy. Thus, to optimize accuracy it is desirable to change detection schemes as the read/write head moves from the inner to outer tracks so that the appropriate detection scheme which most closely matches the shape of the incoming read signals can be utilized.

Present detection systems allow for both PR4 and higher order PRML detection. However, the front end circuitry, such as the continuous time filter and finite impulse response (FIR) filter is different for each type of detection scheme. Therefore, a separate set of these front end components must be included for each PRML order to be detected. Similarly, the timing recovery and gain recovery loops in these systems are dependent upon the order of PRML detection scheme that is being utilized. Accordingly, separate timing recovery and gain recovery circuits must be provided for each order PRML signal to be detected. Thus, systems capable of detecting multiple order PRML signals contain a significant amount of complex, expensive circuity which occupies a large amount of chip area.

SUMMARY OF INVENTION

It is therefore an object of this invention to provide a read system for implementing PR4 and higher order partial response read channels with less circuitry than prior systems and therefore occupies less chip area.

It is a further object of this invention to provide such a read system which does not require separate, different front end and timing and gain recovery circuitry for each order PRML signal to be detected.

It is further an object of this invention to provide such a read system which is less expensive than prior systems.

This invention results from the realization that a truly accurate and less complex read system for implementing PR4 and higher order PRML signals can be achieved by providing a data sequence filter capable of transforming PR4 shaped multilevel read signals to a predetermined order PRML signal wherein the data sequence filter is positioned between the front end of the system which samples and forms the PR4 shaped multilevel read signals from incoming read signals and a Viterbi detector capable of decoding any order PRML signal, such that the front end components and the timing and gain recovery loops of the system operate independent of the order PRML signal being detected thereby avoiding redundancy of components.

This invention features a read system for implementing PR4 and higher order PRML signals. The system includes a continuous time programmable filter for receiving a read signal representative of a binary signal from a storage medium and for shaping the read signal into a PR4 shaped read signal. There is an analog finite impulse response (AFIR) filter, responsive to the continuous time programmable filter, for sampling and forming the PR4 shaped read signal into a PR4 shaped multilevel read signal. There is an analog to digital converter, responsive to the AFIR filter, for converting the PR4 shaped multilevel read signal from analog to digital. There is a data sequence filter, responsive to the analog to digital converter, for transforming the PR4 shaped multilevel digital read signal to a predetermined order PRML signal and a Viterbi detector, responsive to the data sequence filter, for detecting the binary signal from the predetermined order PRML signal.

In a preferred embodiment there may further be included an amplifier for amplifying the read signal before it is supplied to the continuous time programmable filter. The amplifier may be a variable gain amplifier. The system may further include an automatic gain control circuit responsive to the analog to digital converter for adjusting the gain of the variable gain amplifier. The automatic gain control circuit may include a digital gain control loop for adjusting the gain of the variable gain amplifier in response to small deviations of the PR4 shaped multilevel read signal from expected levels and an analog gain control loop for adjusting the gain of the variable gain amplifier in response to large deviations of the read signal from nominal levels. There may further be included a timing recovery system responsive to the analog to digital converter for adjusting the sampling phase of the AFIR filter and the analog to digital converter. The timing recovery system may include a timing recovery circuit for comparing adjacent samples. The timing recovery system may include a digital to analog converter for converting a difference in the adjacent samples from digital to analog. The timing recovery system may include a voltage controlled oscillator responsive to the digital to analog converter for shifting the sampling phase of the AFIR filter and the analog to digital converter. The data sequence filter may include a cascaded delay circuit where the number of periods of delay (n) is equal to the predetermined PRML order. There may further be included an "n" adjust circuit for setting the predetermined order "n" in the delay circuit and the Viterbi detector. The data sequence filter may further include switching means, responsive to the "n" adjust circuit, for outputting the "n" order PRML signal to the Viterbi detector. The predetermined order PRML signal may be expressed by a polynomial of the form $(1-D^2)(1+D)^n$. The AFIR filter may include weighting means for shaping the PR4 shaped read signal to the PR4 shaped multilevel read signal and it may include an adaptive control circuit, responsive to the analog to digital converter, for adjusting the weighting means to conform the read signal to the PR4 shaped multilevel read signal.

This invention further features a read system for selectively implementing PR4 and higher order PRML signals. The system includes means for forming a PR4 shaped multilevel analog read signal from a read signal representative of a binary signal from a storage medium. There is a data sequence filter, responsive to the means for forming, for transforming the PR4 shaped multilevel analog read signal to a predetermined order PRML signal. There is a Viterbi detector, responsive to the data sequence filter, for detecting the binary signal from the predetermined order PRML signal. There are means for selecting the predetermined order PRML signal.

In a preferred embodiment the data sequence filter may include a cascaded delay circuit where the number of periods of delay (n) is equal to the predetermined PRML order. The means for selecting may include an "n" adjust circuit for setting the predetermined order "n" in the delay circuit and the Viterbi detector. The data sequence filter may further include switching means, responsive to the "n" adjust circuit, for outputting the "n" order PRML signal to the Viterbi detector. The predetermined order PRML signal may be expressed by a polynomial of the form $(1-D^2)(1+D)^n$.

BRIEF DESCRIPTION OF THE DRAWINGS

Other objects, features and advantages will occur to those skilled in the art from the following description of a preferred embodiment and the accompanying drawings, in which:

FIG. 1A is a pulse waveform depicting how pulse density is calculated;

FIG. 2A is a PR4 signal pulse waveform;

FIG. 2B is an EPR4 signal pulse waveform;

FIG. 6A is a more detailed schematic block diagram of a simplified data sequence filter as shown in FIG. 3;

FIG. 6B is a chart of the inputs and outputs of the data sequence filter of FIG. 6A;

FIG. 6C is a schematic block diagram of the simplified data sequence filter of FIG. 6A implemented with analog circuitry;

DESCRIPTION OF THE PREFERRED EMBODIMENT

Figure 1:
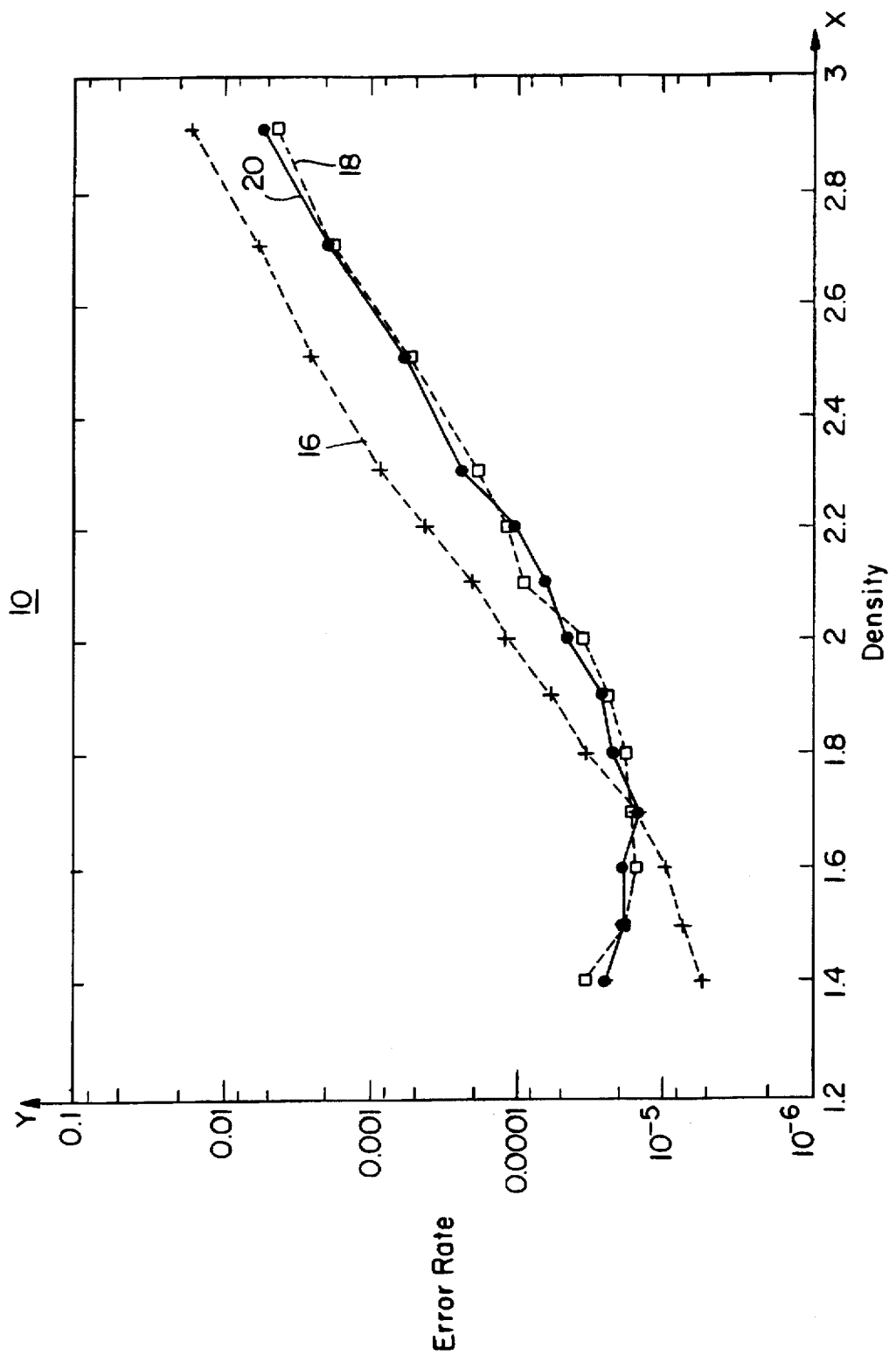
FIG. 1 is a plot of error rate versus pulse density for a PR4 and an EPR4 prior art detection scheme and EPR4 detection according to this invention.

There is shown in FIG. 1 a plot 10 of pulse density versus error rate illustrating the accuracy of PR4 and EPR4 detection schemes in relation to the pulse density. Error rate is depicted on the ordinate or Y axis and pulse density is depicted in the abscissa or X axis. The error rate is the number of errors for a given number of bits read. In other words, an error rate of $10^{-5}$ is equivalent to one error per 100,000 bits read. The pulse density, as shown in FIG. 1A, is equivalent to the pulse width 12 taken, for example, at 50% of the amplitude of pulse 14 divided by the sampling period, $T_{clock}$, i.e., Density=$PW_{50}/T_{clock}$.

In FIG. 1 the error rate versus pulse density is plotted for a PR4 detection system as indicated by plot line 16. The error rate versus pulse density of a prior art EPR4 detection scheme is indicated by plot line 18. Plot line 20 indicates the error rate versus density for an EPR4 detection scheme according to this invention. It can be seen that both plot lines 18 and 20 are very closely matched over the full range of pulse densities, while plot line 16 for a PR4 detection scheme has a better error rate for pulse densities below 1.7. For densities above 1.7 the error rate for a PR4 detection scheme is considerably higher than it is for either EPR4 plot lines 18 or 20. This demonstrates, as described in the Background of Invention, that at lower pulse densities a PR4 detection scheme is more accurate. In contrast, at higher pulse densities the EPR4 detection scheme is more accurate. The main reason for this is due to the fact that at densities greater than 1.7 the noise power and noise correlation are both lower at the input to the Viterbi detector when EPR4 detection is selected. Thus, the error rate is lower when EPR4 detection is used for densities greater than 1.7. Although not shown, higher order PRML detection schemes are even more accurate than the EPR4 detection schemes at higher pulse densities.

Figure 1B:
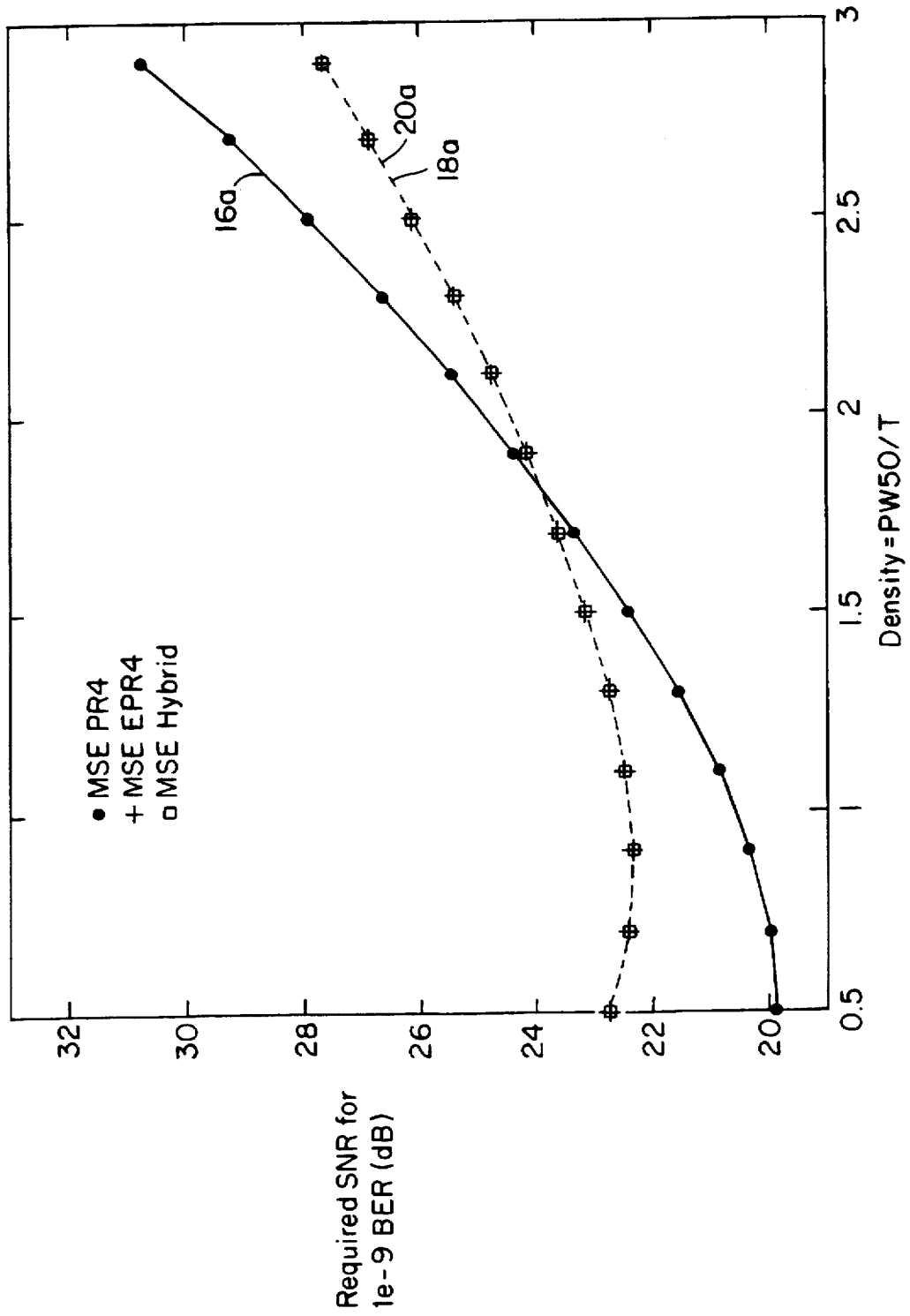
FIG. 1B is a plot of signal to noise ratio versus pulse density for a PR4 and an EPR4 prior art detection scheme and EPR4 detection according to this invention.

Plots of the signal to noise ratio for a bit error rate of $10^{-9}$ versus density are shown in FIG. 1B for a PR4 detection scheme, plot 16a, and for a prior art EPR4 detection scheme and an EPR4 detection scheme according to this invention, plots 18a and 20a, respectively, which coincide. These plots demonstrate that with systems utilizing a PR4 detection scheme for pulse densities below 1.7 a higher signal to noise ratio at the system input can be tolerated while still maintaining a bit error rate of $10^{-9}$. For bit densities above 1.7 EPR4 detection schemes can tolerate more noise at the system input and still achieve this bit error rate.

As described in the Background of Invention, incoming read signals from tracks located at different portions on the disk being read (i.e., inner and outer portions of the disk) have different pulse densities. In order to optimize accuracy (low error rate) it is desirable to switch between at least two detection schemes, e.g., PR4 and EPR4, and it is even more desirable to switch among more than two detection schemes to optimize accuracy. With prior art systems, however, as the number of detection schemes increases so does the complexity of the front end components as well as the timing and gain recovery loops of the systems.

An example of an incoming read pulse that has been transformed into a PR4 target or signal 22 is shown in FIG. 2A. PR4 signal 22 is ideally sampled after every clock period or delay D at points 24, 26, 28 and 30 which are equivalent to the values 0, +1, +1, and 0, respectively. PR4 pulse 22 has a maximum value, for example, of approximately 1.4 which occurs at point 32; however, this point is not sampled in a PR4 detection scheme. If PR4 signal 22 is sampled properly, the detecting system indicates that PR4 signal 22 is a binary one signal that has been read. PR4 pulses such as pulse 22 can be described mathematically in the form of a polynomial as follows:

$$PR4=(1-D)(1+D)=1-D^2 \quad (1)$$

where D is the delay time or clock period between samples taken of PR4 signal 22. This mathematical expression of a PR4 signal is described in detail in Siegel et al., "Modulation and Coding for Information Storage", *IEEE Communications Magazine*, 1991, pgs. 68–86, which is incorporated herein by reference in its entirety.

An example of an incoming read pulse that has been transformed into an EPR4 signal 34 is shown in FIG. 2B. This signal is more spread out than PR4 waveform 22, FIG. 2A, and is ideally sampled after each clock period or delay D at points 36, 38, 40, 42 and 44 at sample levels 0, +1, +2, +1 and 0. Since EPR4 waveform 34 is more spread out than PR4 waveform 22 an extra sample is taken over each EPR4 pulse which occurs at its peak 40. It should be noted that although PR4 pulse 22 and EPR4 pulse 34 are shown to be positive going pulses they could just as well have been depicted as negative going pulses.

EPR4 waveforms can also be expressed mathematically in terms of the following known polynomials:

$$EPR4=(1-D)(1+D)^2=(1-D)(1+D)(1+D)=(1-D^2)(1+D)=PR4(1+D) \quad (2)$$

When the EPR4 signal is expressed as a polynomial it can be reduced to $(1-D^2)(1+D)$. As shown in equation (1) the polynomial expression for PR4 is equivalent to $(1-D^2)$. Thus, the EPR4 signal can be expressed as a PR4 signal multiplied by $(1+D)$. In addition, PRML signals of an order higher than EPR4 (e.g., $E^2PR4$, $E^3PR4$, ... $E^nPR4$) can similarly be expressed as follows:

$$PR4(1+D)^n \quad (3)$$

That is, higher order PRML waveforms (i.e. n>1) which have more sampling points for each pulse may be expressed in terms of the simplified polynomial in equation (3).

From this realization the present inventors discovered that incoming read signals may be transformed to a PR4 signal and any order PRML detection scheme may be used by converting the PR4 signal into any order PRML signal by passing the PR4 signals through a data sequence filter with a transfer function equivalent to $(1+D)^n$.

Figure 3:
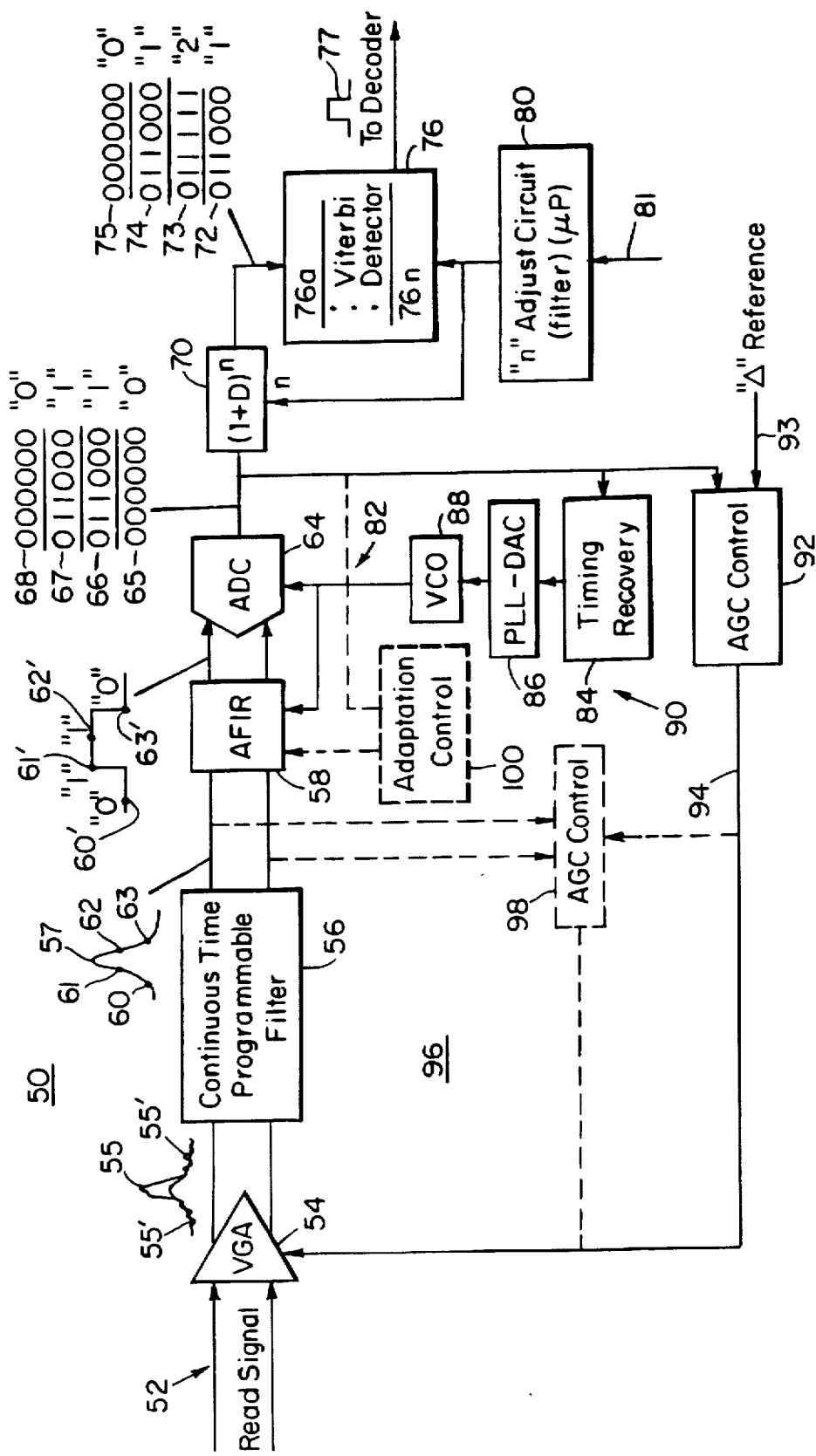
FIG. 3 is a schematic block diagram of the read system for implementing PR4 and higher order PRML signals according to this invention.

System 50, FIG. 3, according to the present invention accomplishes the above described functions. System 50 receives at variable gain amplifier 54 incoming read signal 52 which is representative of a binary signal obtained from a storage medium (not shown) such as a disk or tape. Variable gain amplifier 54 provides an amplified read signal 55 to continuous time programmable filter 56. Amplified read signal 55, in this case, is a positive going pulse which represents a binary one. Signal 55 includes noise 55' located on either side of the pulse. Continuous time programmable filter 56 filters out noise 55' by limiting the bandwidth of signal 55 and it also approximately equalizes the raw read signal 55 to shape it into a PR4 signal as indicated by pulse 57. PR4 pulse 57 is provided to analog finite impulse response (AFIR) filter 58 driven by a system sampling clock (not shown) which samples the pulse at sample points 60, 61, 62 and forms the signal into a PR4 shaped ternary or multilevel read signal as indicated by pulse 59 with sample points 60', 61', 62' and 63' ideally equal to 0, +1, +1 and 0, respectively. The PR4 shaped multilevel read signal is provided to analog to digital converter 64 which is also driven by the system sampling clock outputs, typically a 6 bit parallel word representing the value of each sampled point on pulse 59, for example. The output of analog to digital converter 64 for sample points 60–63 is shown as parallel digital words 65–68 which are equivalent to binary values 0, 1, 1 and 0, respectively. Each word is then input sequentially into data sequence filter 70 which transforms the PR4 shaped multilevel digital read signal to a PRML signal of a predetermined order. That is, it can output a PR4 shaped multilevel signal, an EPR4 shaped multilevel signal, or any higher order signal from the PR4 shaped multilevel signal input. Data sequence filter 70 has a transfer function equivalent to $(1+D)^n$. Since, as described above, a PR4 signal multiplied by $(1+D)$ results in the transformation from a PR4 signal to an EPR4 signal and the multiplication of a PR4 signal by $(1+D)^n$, equals any "n" order PRML signal, higher order PRML signals can be obtained directly from the PR4 equalized signals without any performance loss.

The output of data sequence filter 70 with n=1 (EPR4) is shown as four 6 bit digital words 72–75 having levels 1, 2, 1 and 0, respectively, which corresponds to an EPR4 signal. Thus, by passing digital words 65–68 having levels 0, 1, 1 and 0, respectively, which correspond to a PR4 signal, such as pulse 57, through data sequence filter 70 that pulse is transformed into an EPR4 pulse. The EPR4 pulse, represented by digital words 72–75, is provided to Viterbi detector 76 to decode the incoming EPR4 data sequence and output a serial binary output 77. Viterbi detector 76 includes several separate Viterbi detectors 76a–76n each capable of decoding a different order PRML signal (from PR4 to $E^nPR4$).

A programmable "n" adjust circuit 80 sets the predetermined order "n" of data sequence filter 70 while simultaneously adjusting Viterbi detector 76 to enable the detector to decode that predetermined "n" order PRML signal which will be output from data sequence filter 70. Programmable "n" adjust circuit 80 typically automatically on the fly adjusts the "n" order of filter 70 and Viterbi detector 76 in response to a read head position signal on line 81 as the read head reads different portions of the disk in order to optimize accuracy by matching the shape of the incoming pulses with a particular order PRML signal. Or, the "n" order may be selected by the user. That is, "n" adjust circuit 80 changes detection schemes from, e.g., PR4 (n=o) to EPR4 (n=1) .. . $E^nPR4$ by selecting the appropriate PRML order output from data sequence filter 70 and selecting the corresponding Viterbi detector 76a–76n within detector 76 to decode the order PRML signals selected without requiring that the incoming read signal 52 be initially transformed to other than a PR4 signal.

Timing recovery loop 82 adjusts the sampling phase of AFIR filter 58 and analog to digital converter 64 by adjusting the sampling time to insure that incoming pulse 57 from continuous time programmable filter 56 is being sampled appropriately, i.e. that sample points 61 and 62 are at equal levels. This is accomplished by providing in timing recovery loop 82 a timing recovery circuit 84 which receives from the output of analog to digital converter 64 each of the parallel digital word samples 65–68 and performs a thresholding function on each incoming sample to determine if its value exceeds a predetermined level above the expected noise level. This is because the timing recovery loop 82 is concerned only with ensuring that the +1, −1 samples of each PR4 pulse are at equal absolute levels. Timing recovery circuit 84 then compares each set of adjacent samples which do exceed the predetermined threshold level to determine if they are equal and if the sampling is in phase. If adjacent samples are not equal a digital difference signal is output to phase locked loop digital to analog converter 86 which converts the digital difference signal to an analog difference signal and provides that signal to voltage controlled oscillator 88. Voltage controlled oscillator 88 provides a signal to both AFIR filter 58 and analog to digital converter 64 for shifting the sampling phase of these components such that incoming pulse 57 is being properly sampled. Once timing recovery loop is running it will lock onto a sampling phase which continuously samples PR4 signal 57 at the appropriate sampling rate.

Digital automatic gain recovery tracking loop 90 includes automatic gain control 92 which receives parallel digital samples 65–68 from the output of analog to digital converter 64 and compares samples that are above the noise level to a reference level of one introduced at input 93. When the samples are not equivalent to one a digital gain error signal is provided over feedback line 94 to variable gain amplifier 54 to adjust the level of output pulse 55 to ensure that sample points such as 61 and 62 on PR4 signal 57 are occurring at a level of one.

An analog gain recovery control loop 96, shown in phantom, also called an acquisition loop, may be included. Analog gain control loop 96 includes analog gain control 98 which receives at its input the output of digital gain control 92 and the analog output of continuous time programmable filter 56. The output of analog gain control 98 is connected to variable gain amplifier 54. In operation, as a varying analog read signal is delivered to variable gain amplifier 54 and passed through continuous time programmable filter 56 this signal is provided to analog gain recovery loop 96 and eventually to digital gain recovery loop 90. Loop 90 provides, as described above, a gain error signal over line 94 to automatic gain control 98 and analog loop 96 responds in a similar fashion to the output of continuous time programmable filter 56 to produce an error signal when the output signal levels of continuous time programmable filter 56 deviate from expected nominal levels. Then, either one or both of the error signals from the digital and analog loops 90 and 96, respectively, are used to adjust the gain of the variable gain amplifier 54 so that the sampling points, such as 61 and 62, for example, are always locked at a level of one regardless of excursions in the read signals 52.

When analog loop 96 is utilized typically digital or tracking loop 90 adjusts for smaller deviations in the read signals 52 and is operational most or all of the time, whereas the analog gain recovery or acquisition loop 96 operates only when the deviations are large to quickly bring the system back close to its nominal range where digital loop 90 can operate to complete the adjustment.

Adaptation control 100, shown in phantom, may be included to adjust the output of AFIR filter 58 in response to the output of analog to digital converter 64 to optimize the output of analog to digital converter 64 so that it closely matches the expected digital output from a PR4 signal input into AFIR 58.

Figure 4:
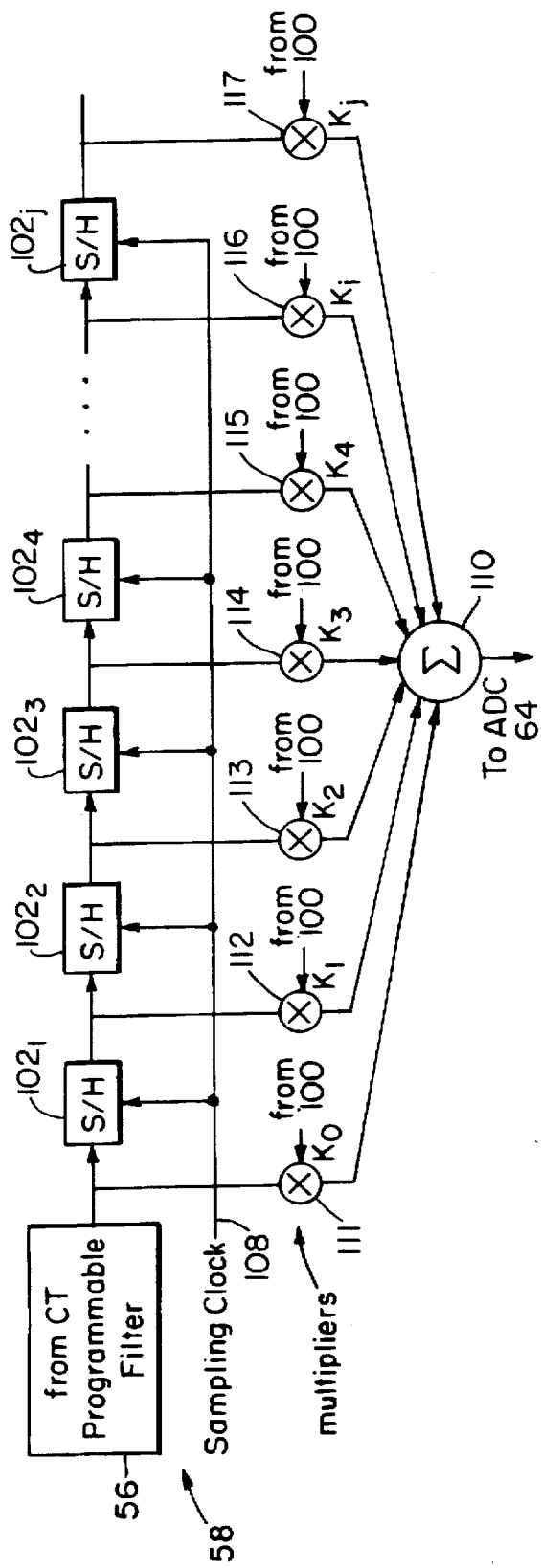
FIG. 4 is a more detailed schematic block diagram of the AFIR filter of FIG. 3.

AFIR filter 58 is shown in more detail in FIG. 4 to include a plurality of sample and hold circuits $120_1$ through $102_j$ which are operated under the control of the sampling clock which activates sample and hold circuits $102_1$–$102_j$ by providing a signal over line 108 each time a sample of the signal from continuous time programmable filter 56 is input to AFIR filter 58. The incoming PR4 shaped signal from continuous time programmable filter 56 is sampled by sample and hold circuit $102_1$ and as further samples are taken by sample and hold circuit $102_1$ the previous samples are propagated through to the remaining sample and hold circuits $102_2$–$102_j$. The output of each sample and hold circuit as well as the input to the first sample and hold circuit 102 are provided to summing circuit 110 which sums all of the outputs and the one input and provides an output to analog to digital converter 64 at each sample time. Between each output of the sample and hold circuits (and the one input to sample and hold circuit $102_1$) and summing circuit 110 are a number of multipliers 111–117 ($K_0$–$K_j$) which receive an input weighting signal from adaptation control 100, FIG. 3. Adaptation control 100 provides weighting signals to the multipliers which adjust the magnitude of the signals provided to summing circuit 110 in order to adjust the output to analog to digital converter 64 so that it correctly conforms to the PR4 signal from continuous time programmable filter 56 and the PR4 signal template.

Figure 5:
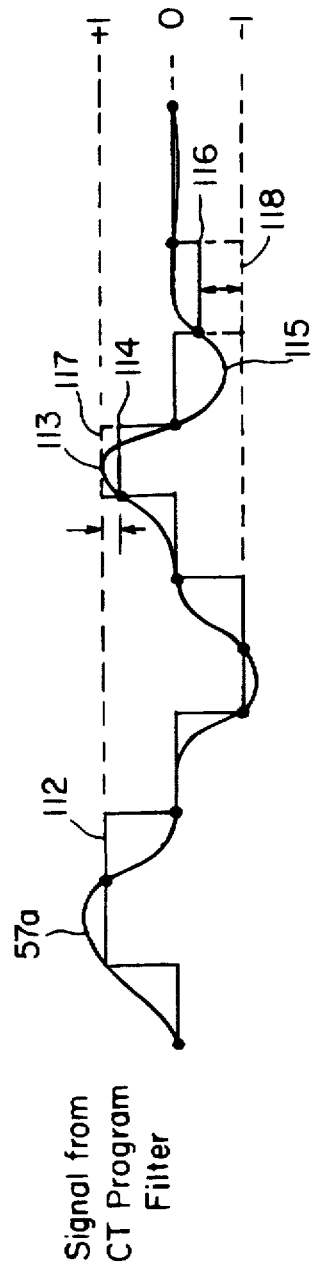
FIG. 5 depicts several waveforms to demonstrate the operation of the adaptation control and AFIR filter of FIG. 3.

An illustration of how adaptation control 100, FIG. 3, operates in conjunction with AFIR filter 58, FIGS. 3 and 4, is depicted in FIG. 5. Incoming PR4 shaped signal 57a from continuous time programmable filter 56, FIG. 3, produces PR4 shaped multilevel output signal 112 from analog to digital converter 64. Positive going pulse 113 produces a PR4 shaped multilevel read signal level 114 which is at a level slightly below the expected level of "+1" causing a misshaping of the PR4 shaped multilevel read signal 112. Similarly, negative going pulse 115 produces a PR4 shaped multilevel read signal level 116 which is not at the expected level of "−1" which also causes a misshaping of the multilevel signal 112. Adaptation control 100 detects this misshaping and uses a least means square (LMS) algorithm to generate coefficient updates to multipliers 111–117 of AFIR filter 58 to adjust the shape of signal 112 so that it conforms to the PR4 shaped multilevel signal as "+1" and "−1" indicated by levels 117 and 118, respectively.

Data sequence filter 70a, FIG. 6A, which is a simplified version of data sequence filter 70, FIG. 3, includes delay circuit 120 whose transfer function is equal to (1+D). This data sequence filter 70a transforms incoming PR4 shaped multilevel signals to EPR4 shaped multilevel signals. This simplified data sequence filter is depicted to demonstrate the basic operation of filter 70, FIG. 3. Delay circuit 120 includes a delay register 122 and an adder 124. An input from analog to digital converter 64, FIG. 3, is input to both delay register 122 and adder 124. The adder 124 initially receives no input from the delay register 122 so adder 124 outputs the signal from analog to digital converter 64 to Viterbi detector 76, FIG. 3. However, during the next sample period delay register 122 outputs to adder 124 the previous sample which was delayed one sample period. This previous sample is added to the present sample received from analog to digital converter 64. The signals are added and the summed signal is provided to Viterbi detector 76. A chart of inputs from analog to digital converter 64 to data sequence filter 70a and its outputs to Viterbi detector 76 are shown in FIG. 6B. In the input column 126 is shown a PR4 sequence for a PR4 pulse 0, 1, 1, 0, such as digital outputs 65–68, FIG. 3. The outputs to Viterbi detector 76 are shown in column 128 to be 0, 1, 2 and 1 which correspond to the EPR4 outputs 72–75, FIG. 3. This illustrates that data sequence filter 70a with a transfer function (1+D) transforms a PR4 input signal to an EPR4 output signal.

Alternatively, system 50, FIG. 3, could be implemented entirely with analog circuitry. In this configuration analog to digital converter 64 is removed from the system and the output of continuous time programmable filter 56 is supplied directly to data sequence filter 70. Also, the gain and phase control circuits are implemented with analog circuitry. A simplified data sequence filter 70a', FIG. 6C, implemented with analog circuitry includes an analog delay circuit 120' with sample and hold circuit 122' in place of delay register 122, FIG. 6A, and an analog adder 124' in place of digital adder 124. Analog data sequence filter 70a' has a transfer function (1+D).

Those skilled in the art will also recognize that it is also possible to implement a data sequence filter with transfer function (1+D)/2 for EPR4 detection. This will yield output values of 0, ½, 1 and ½ for an input sequence 0, 1, 1, 0. The division by 2 maintains the same precision requirements in the add-compare-select (ACS) units in both the PR4 and EPR4 Viterbi detectors.

Data sequence filter 70b is a more complicated filter which allows for the transformation of a PR4 input signal to any order PRML signal, including PR4, EPR4 and higher order EPR4 signals, such as $E^2PR4 \ldots E^nPR4$. This is accomplished by providing within data sequence filter 70b a plurality of cascaded delay circuits 120a–120n where delay circuit 120a corresponds to delay 120 in FIG. 6A and has a transfer function of 1+D. Delay circuits 102a–120n when cascaded with preceding delay circuits results in a transfer function $(1+D)^n$ for data sequence filter 70b, where the number of delay periods n is equal to the PRML order. The output at each stage of the plurality of cascaded delay circuits are provided to multiplexer 126 which also receives the PR4 signal directly from analog to digital converter 64. Thus, when programmable "n" adjust circuit 80, FIG. 3, provides a signal to multiplexer 126, according to which order PRML signal it desires, i.e. 0 . . . n, the appropriate output is provided to the Viterbi detector 76 which also receives that n signal and selects the appropriate Viterbi detector 76a–n.

Figure 7B:
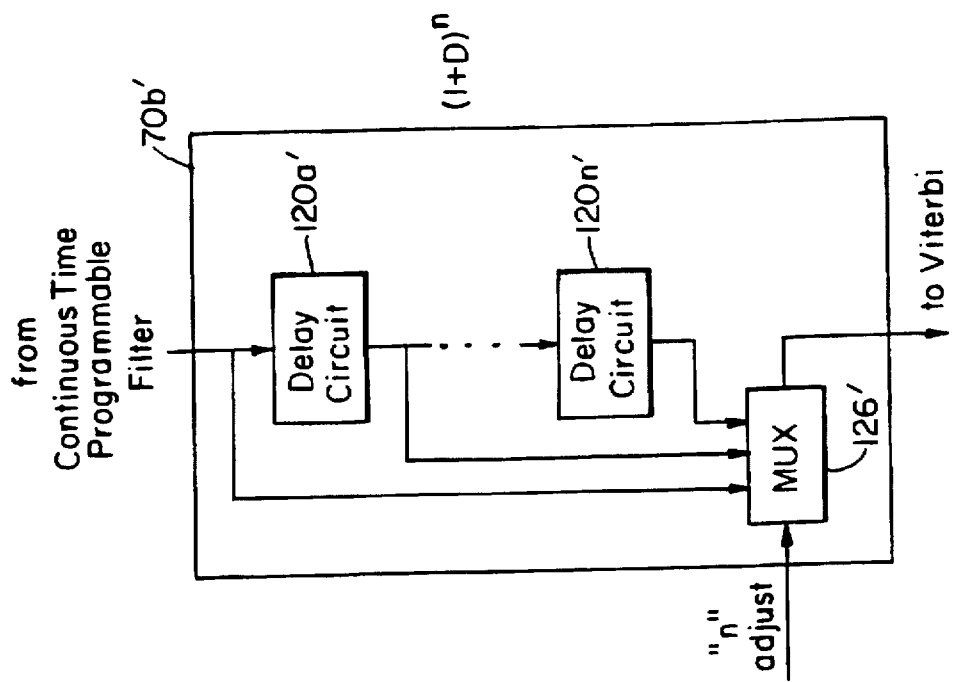
FIG. 7B is a schematic block diagram of the data sequence filter of FIG. 7A implemented with analog circuitry.
Figure 7A:
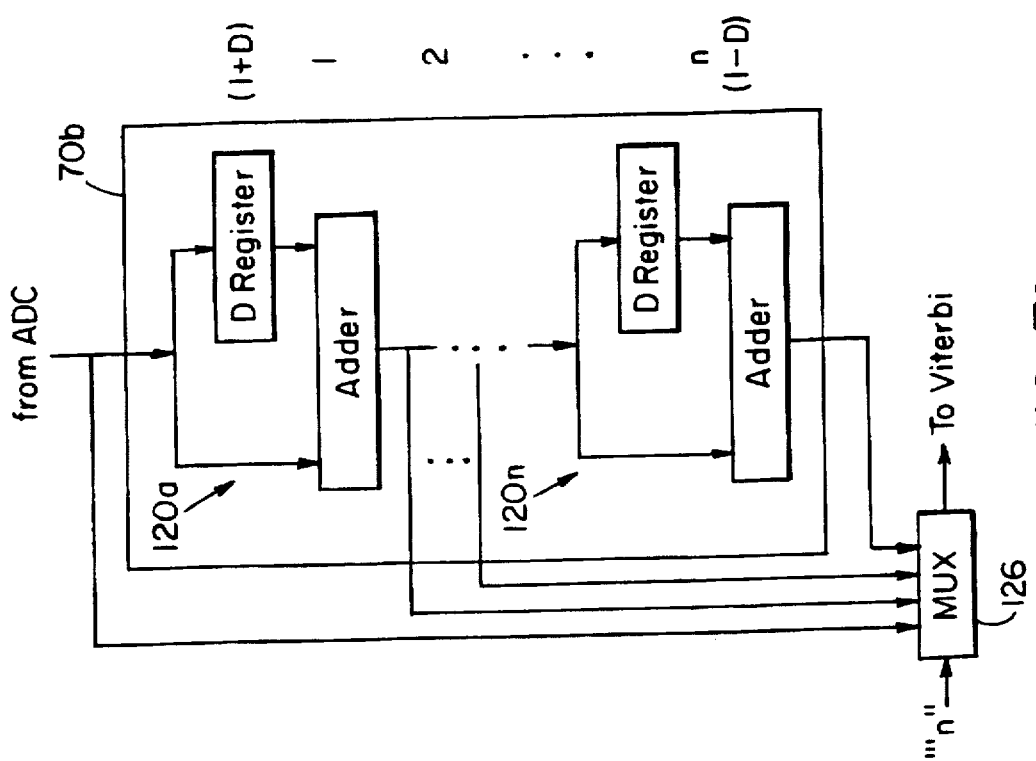
FIG. 7A is a detailed schematic block diagram of the data sequence filter used in the system of FIG. 3.

Alternatively, analog data sequence filter 70b', FIG. 7B, which includes a plurality of cascaded analog delay circuits 120a'–120n' having a transfer function $(1+D)^n$ could be used. Analog multiplexer 126' in response to a signal from "n" adjust circuit 80, FIG. 3, outputs to Viterbi detector 76, FIG. 3, the selected order PRML signal. Viterbi detector 76 in this case is configured to receive analog signals.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A read system for implementing PR4 and higher order PRML signals, said system comprising:

a continuous time programmable filter for receiving a read signal representative of a binary signal from a storage medium and for shaping said read signal into a PR4 shaped read signal;

an analog finite impulse response (AFIR) filter, responsive to said continuous time programmable filter, for sampling and forming said PR4 shaped read signal into a PR4 shaped multilevel read signal;

an analog to digital converter, responsive to said AFIR filter for converting said PR4 shaped multilevel read signal from analog to digital;

means, responsive to a read head position signal, for selecting a predetermined order PRML signal;

a data sequence filter, responsive to said analog to digital converter and said means for selecting, for transforming said PR4 shaped multilevel digital read signal to said predetermined order PRML signal; and a Viterbi detector, responsive to said data sequence filter, for detecting said binary signal from said predetermined order PRML signal.

2. The read system of claim 1 further including an amplifier for amplifying said read signal before it is supplied to said continuous time programmable filter.

3. The read system of claim 2 in which said amplifier is a variable gain amplifier.

4. The read system of claim 3 further including an automatic gain control circuit responsive to said analog to digital converter for adjusting the gain of said variable gain amplifier.

5. The read system of claim 4 in which said automatic gain control circuit includes a digital gain control loop for adjusting the gain of said variable gain amplifier in response to small deviations of said PR4 shaped multilevel read signal from expected levels and an analog gain control loop for adjusting the gain of said variable gain amplifier in response to large deviations of said read signal from nominal levels.

6. The read system of claim 1 further including a timing recovery system responsive to said analog to digital converter for adjusting the sampling phase of said AFIR filter and said analog to digital converter.

7. The read system of claim 6 in which said timing recovery system includes a timing recovery circuit for comparing adjacent samples.

8. The read system of claim 7 in which said timing recovery system includes a digital to analog converter for converting a difference in said adjacent samples from digital to analog.

9. The read system of claim 8 in which said timing recovery system includes a voltage controlled oscillator responsive to said digital to analog converter for shifting the sampling phase of said AFIR filter and said analog to digital converter.

10. The read system of claim 1 in which said data sequence filter includes a cascaded delay circuit where the number of periods of delay (n) is equal to the predetermined PRML order.

11. The read system of claim 10 in further including an "n" adjust circuit for setting the predetermined order "n" in said delay circuit and said Viterbi detector.

12. The read system of claim 11 in which said data sequence filter further includes switching means, responsive to said "n" adjust circuit, for outputting the "n" order PRML signal to said Viterbi detector.

13. The read system of claim 10 in which said predetermined order PRML signal can be expressed by a polynomial of the form $(1-D^2)(1+D)^n$.

14. The read system of claim 1 in which said AFIR filter includes weighting means for shaping said PR4 shaped read signal to said PR4 shaped multilevel read signal and an adaptive control circuit, responsive to said analog to digital converter, for adjusting said weighting means to conform said read signal to said PR4 shaped multilevel read signal.

15. A read system for selectively implementing PR4 and higher order PRML signals, said system comprising:

means for forming a PR4 shaped multilevel analog read signal from a read signal representative of a binary signal from a storage medium;

a data sequence filter, responsive to said means for forming, for transforming said PR4 shaped multilevel analog read signal to a predetermined order PRML signal;

a Viterbi detector, responsive to said data sequence filter, for detecting said binary signal from said predetermined order PRML signal; and means, responsive to a read head position signal, for selecting said predetermined order PRML signal.

16. The read system of claim 15 in which said data sequence filter includes a cascaded delay circuit where the number of periods of delay (n) is equal to said predetermined PRML order.

17. The read system of claim 16 in which said means for selecting includes an "n" adjust circuit for setting the predetermined order "n" in said delay circuit and said Viterbi detector.

18. The read system of claim 17 in which said data sequence filter further includes switching means, responsive to said "n" adjust circuit, for outputting the "n" order PRML signal to said Viterbi detector.

19. The read system of claim 16 in which said predetermined order PRML signal can be expressed by a polynomial of the form $(1-D^2)(1+D)^n$.

\* \* \* \* \*